(12) United States Patent
Eilam et al.

(10) Patent No.: US 7,783,759 B2
(45) Date of Patent: Aug. 24, 2010

(54) METHODS AND APPARATUS FOR DYNAMIC ALLOCATION OF SERVERS TO A PLURALITY OF CUSTOMERS TO MAXIMIZE THE REVENUE OF A SERVER FARM

(75) Inventors: Tamar Eilam, New York, NY (US); German Sergio Goldszmidt, Dobbs Ferry, NY (US); Ta-Hsin Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1716 days.

(21) Appl. No.: 10/316,251

(22) Filed: Dec. 10, 2002

(65) Prior Publication Data

US 2004/0111509 A1 Jun. 10, 2004

(51) Int. Cl.
 *G06F 15/173* (2006.01)
(52) U.S. Cl. .................... 709/226; 709/223; 709/224
(58) Field of Classification Search ........................ None
 See application file for complete search history.

(56) References Cited

U.S. PATENT DOCUMENTS

| | | | | |
|---|---|---|---|---|
| 5,802,301 A | * | 9/1998 | Dan et al. ................... | 709/223 |
| 5,923,849 A | * | 7/1999 | Venkatraman ............... | 709/224 |
| 6,233,226 B1 | * | 5/2001 | Gringeri et al. ............. | 370/252 |
| 6,332,163 B1 | * | 12/2001 | Bowman-Amuah ......... | 709/231 |
| 6,473,794 B1 | * | 10/2002 | Guheen et al. .............. | 709/223 |
| 6,563,792 B1 | * | 5/2003 | Chang et al. ............. | 370/235.1 |
| 6,615,166 B1 | * | 9/2003 | Guheen et al. ................ | 703/27 |
| 6,738,813 B1 | * | 5/2004 | Reichman ................... | 709/224 |
| 6,986,139 B1 | * | 1/2006 | Kubo .......................... | 718/105 |
| 6,999,416 B2 | * | 2/2006 | Wang et al. ................. | 370/230 |
| 7,062,556 B1 | * | 6/2006 | Chen et al. .................. | 709/226 |
| 7,099,879 B2 | * | 8/2006 | Tacaille et al. .............. | 707/100 |
| 7,284,047 B2 | * | 10/2007 | Barham et al. .............. | 709/224 |
| 7,343,337 B1 | * | 3/2008 | Cieliebak et al. .......... | 705/36 R |

* cited by examiner

*Primary Examiner*—Vivek Srivastava
*Assistant Examiner*—Azizul Choudhury
(74) *Attorney, Agent, or Firm*—Derek S. Jennings; Anne Vachon Dougherty

(57) ABSTRACT

A method and structure for dynamic allocation of servers to customers in a server farm which supports a flexible contract structure such that the total revenue of the farm is maximized. The invention creates a resource allocation plan based on a long term forecast for the server farm, taking into account traffic, number of servers, customers' contracts and revenue optimization algorithms. The plan is then modified as indicated by short term forecasting using currently monitored load metrics to reallocate to maximize revenue for particular time periods.

4 Claims, 6 Drawing Sheets

_US 7,783,759 B2_

METHODS AND APPARATUS FOR DYNAMIC ALLOCATION OF SERVERS TO A PLURALITY OF CUSTOMERS TO MAXIMIZE THE REVENUE OF A SERVER FARM

FIELD OF THE INVENTION

The present invention relates generally to a worldwide network, and more particularly to a plurality of Internet sites of various owners, wherein the sites are all hosted by a service provider using a set of servers that are dynamically assigned to the sites in accordance with agreed-upon service level agreements.

BACKGROUND OF THE INVENTION

The Internet is essential to businesses as well as to customers. Many businesses or "site owners" out-source their e-commerce and e-commerce Web sites to service providers rather than operate and manage the sites on their own servers. The service provider uses a set of servers in a group called a Server Farm (SF). The SF is used by many different businesses, the service providers' customers, to run their applications.

Traditionally, a fixed set of servers in a server farm is assigned and used by every customer. Servers are added or removed from a customer's set in response to an explicit request and the process, requiring human intervention, can take several days. The prior art solution is labor intensive and does not address the order of magnitude difference between peak and average workload.

To facilitate server allocation, server farms have been implemented wherein servers are allocated to customers dynamically and automatically according to monitored workload. The systems are termed Dynamic Reactive Server Farm (DRSF). In DRSF systems, it is assumed that every customer has an agreement, termed a Service Level Agreement (SLA), with the owner of the server farm. The SLA specifies a minimum number of servers SMIN and a maximum number of servers SMAX to be allocated to the customer. Servers are dynamically and automatically allocated between these bounds on a best-effort basis, according to the load. Customers pay for the service based on actual server usage.

Current DRSF systems operate in a reactive and greedy fashion, such that servers are allocated according to the current monitored load, one server at a time, until the load decreases to the required level. In the case of a contention over resources, resources will be assigned to needy customers on a "first-come-first-serve" basis.

Being reactive and greedy, current DRSF systems need improvement in the areas of performance, revenue generation, flexibility, and system stability. With regard to performance, customers might experience long periods of lesser performance due to the reactive nature of the system, since resource allocation decisions are made according to the current load, and not the expected load. Moreover, with servers being allocated in an incremental fashion, whereby the system waits for a stabilization period until it decides to allocate another server, resource allocation lags after workload changes and affects current performance.

The performance problem also leads to lower revenue for the server farm's owner. When servers that are needed for a customer are not allocated on time, potential revenue is foregone. Moreover, penalties are often assessed for not meeting availability guarantees which have been promised to the customer. Yet another reason for lower revenue is that servers are allocated on a first-come-first-serve basis without taking into account customers Service Level Agreements (SLAs).

System stability is affected when servers are allocated as a reaction to a short temporary fluctuation in the load and are de-allocated shortly thereafter. Such a reaction imposes unnecessary overhead and load on the system.

Finally, current DRSF solutions support only a simplified and rigid SLA structure whose main parameters are SMIN and SMAX. As a result, more flexible offers that might be suitable for a wider variety of customers, including such features as more levels of guarantee (beyond "best effort"), different rates for servers, and penalties for violations, cannot be supported.

Accordingly, it is an objective of the present invention to provide a server allocation and billing system and method which is flexible, providing system stability and good performance, and which increases server farm revenues.

SUMMARY OF THE INVENTION

The foregoing and other objectives are realized by the present invention which provides a method and structure for dynamic allocation of servers to customers in a server farm which supports a flexible contract structure such that the total revenue of the farm is maximized. The invention utilizes forecasting for the server farm traffic and workload and optimization algorithms based on customers' contracts.

BRIEF DESCRIPTION OF THE DRAWINGS

The invention will now be described in greater detail with specific reference to the drawings wherein.

DETAILED DESCRIPTION OF THE INVENTION

Figure 1:
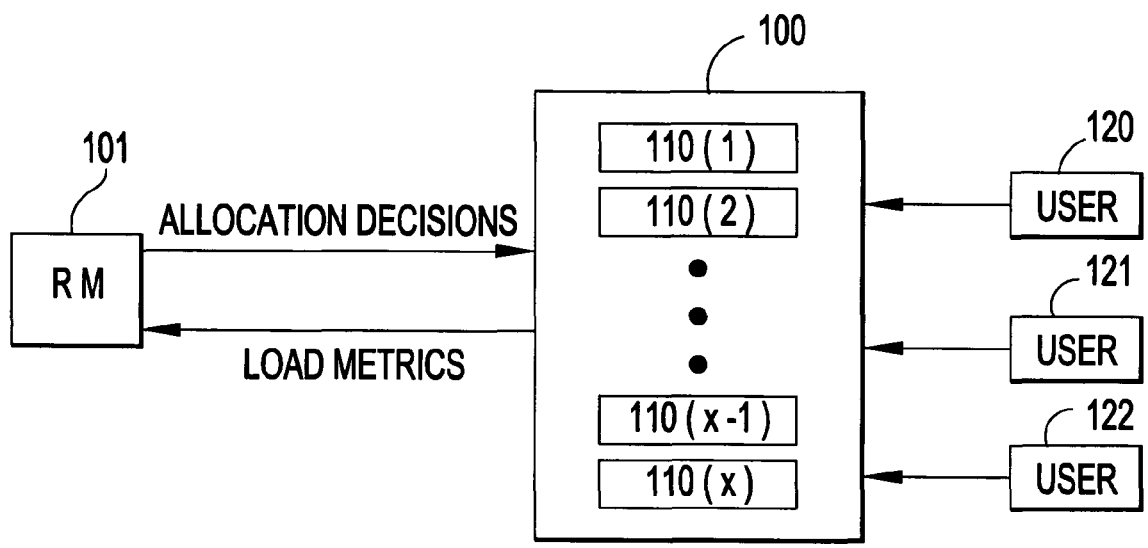
FIG. 1 illustrates a prior art server farm.

It is well known that Internet traffic follows so-called "seasonal" patterns, such that the traffic pattern repeats itself daily. The invention takes advantage of this characteristic to allocate servers according to the expected workload as well as the current workload. A forecast of the traffic and workload is generated for every customer for the next day based on profiled data. This forecast is consolidated with information from the customers' contracts using an optimization algorithm to generate a base allocation plan for the next day that will maximize the revenue of the server farm. The allocation plan is refined as a response to unexpected workload changes, thus the flexibility of the system is not compromised.

The invention offers the following advantages over prior art DRSF systems: Customers' application performance is improved because servers are proactively allocated to customers according to the expected workload, instead of waiting for threshold events triggered by workload increase and resulting performance deterioration. The revenue of the farm is maximized due to the optimization algorithm consolidating the workload forecast and the contract information. The system is more stable, due to the forecasting methods that can differentiate between temporary fluctuations in workload and real workload changes. Finally, the invention supports a flexible contract structure that might be suitable to a wider variety of customers.

The present invention supports a flexible and complex Multi-Layer Infrastructure Service Level Agreement (MLISLA) structure (LAYER$_1$, LAYER$_2$, LAYER$_3$, ..., LAYER$_k$, MAP). The mapping function MAP maps monitored metrics (or an aggregation of metrics) to a required range of servers; namely, MAP(Mt)=(MIN(Mt), MAX(Mt)), meaning that at least MIN(Mt) number of servers are required to support the current load Mt, while any server beyond MAX(Mt) servers is superfluous for this purpose. Therefore, if the number of servers that are allocated when the load is Mt is less than X, the servers are considered overloaded. When load is between X and Y, the servers are considered well-balanced, and when the load is greater than Y, the servers are considered under-loaded.

The invention is not restricted to any one method of mapping load to a range of required number of servers. Every LAYERi=(BOUND$_i$, GUARANTEE$_i$, REVENUE$_i$, PRENALTY$_i$, BASE$_i$) is associated with the following parameters:

Layer's Boundary BOUNDi is defined as the (MIN$_i$, MAX$_i$) of servers (where always MINS$_{i+1}$=MAXS$_i$+1).

GUARANTEE$_i$ specifies the guarantee level that if a number of servers N in this layer (MINSi≦N≦MAXSi) are needed (as indicated by the mapping function MAP) then this number is indeed allocated to the customer. One example of a specification of a GUARANTEE can be an upper bound on the percentage of time units in which a server that is needed in this layer is not available for the customer. A specification of GUARANTEE can also include a grace period in which a violation is not counted.

REVENUE$_i$ represents the rate charged for a needed server which allocated in the layer for a unit time.

PENALTY$_i$ is a function that specifies the amount paid by the farm to the customer if a GUARANTEE is violated. The penaltysure can be expressed, for example, as a fixed amount for a needed server in the layer which is not available for a unit time.

BASE$_i$ is a fixed monthly charge associated with the layer. The base component encapsulates other fixed costs of the farm, and can be used as an incentive for the customer to specify realistic parameters (e.g., by using a function for BASE$_i$ that depends on MAXS$_i$).

It should also be understood that allocation of servers need not be the allocation of discrete, full servers but can be generalized to apply to the allocation of continuous server space (i.e., less than all of a server's capability, for example, based on known partitioning).

An example of a simple 3-layer MLISLA specifies that 3 servers are always allocated (100% guarantee), between 4 to 7 servers are allocated with strong guarantee (e.g., 99% of the time that a server in this layer is needed it is available), and between 7 to 15 servers are allocated with weak guarantee (e.g., 40% guarantee that a needed server in this layer will be available).

The foregoing MLISLA billing system can be realized in the inventive REACTIVE PROACTIVE DYNAMIC SERVER FARM (RPDSF). In a RPDSF system, every customer is associated with an MLISLA structure that is an assignment of values to the set of parameters defined above (MINS$_i$ and MAXS$_i$, for every layer i, etc.). It is noted that the parameter values can change dynamically over time. The MLISLA values for the set of customers are input to the resource allocation algorithms used by the system.

An RPDSF system works as follows. Traffic and workload are monitored continuously and logged at a storage device. The data is analyzed by a Long-Term Forecasting Module (LTFM) to generate for every customer a forecast of the traffic and workload for the next day (or a few days in advance) in the form of a time series. These sets of forecasts are consolidated with the customers' MLISLAs by a Resource Allocation Plan Construction Module (RAPCM) to generate a base Resource Allocation Plan (RAP) for the next day (or a few days in advance) in the form of a table that describes the optimal assignment of servers to customers in every time-slot.

A Resource Manager (RM) is responsible for making allocation decisions in real time based on the RAP and the monitored workload. The Resource Manager uses a Resource Control Algorithm (RCA) and a Short-Term Forecasting Module (STFM) with a forecasting horizon (e.g., hours or minutes) which is shorter than that of the LTFM. The role of STFM is to generate, based on monitored metrics, threshold alerts if the current load is different from what was anticipated by the LTFM. The RM refines the RAP-based assignment of servers according to these alerts using a simple and efficient greedy algorithm suitable for real-time usage. Thus the RPDSF system does not compromise flexibility in adjustment to any workload state while the system has the benefits of planning and learning, taking advantage of persistent traffic patterns (e.g., "seasonality") and the optimization algorithms. The LTFM, RAPCM and RM with RCA and STFM may be implemented as software program components stored on a computer storage device readable by machine.

FIG. 1 depicts a current DRSF system including server farm 100 which has servers 110(1) through 110(x). Requests R are received for customers sites from a plurality f users, representatively shown as 120-122. A set of load metrics is measured continuously at every customer's site. For customer i, the load metrics are the number of servers N(i), the arrival rate of requests for the site, AR(i), and the load metric, M(i). Threshold events are generated according to the current load. The Resource Manager (RM) 101 allocates or de-allocates servers according to these threshold values. Servers are allocated to customers on a "first-come-first-serve" basis with no notion of differentiating between customers according to their contracts. There is no logging or analysis of customers' workload and performance. The RM 101 simply receives the load metrics input, generates the allocation decision for each customer, and delivers the results to the farm 100.

Figure 2:
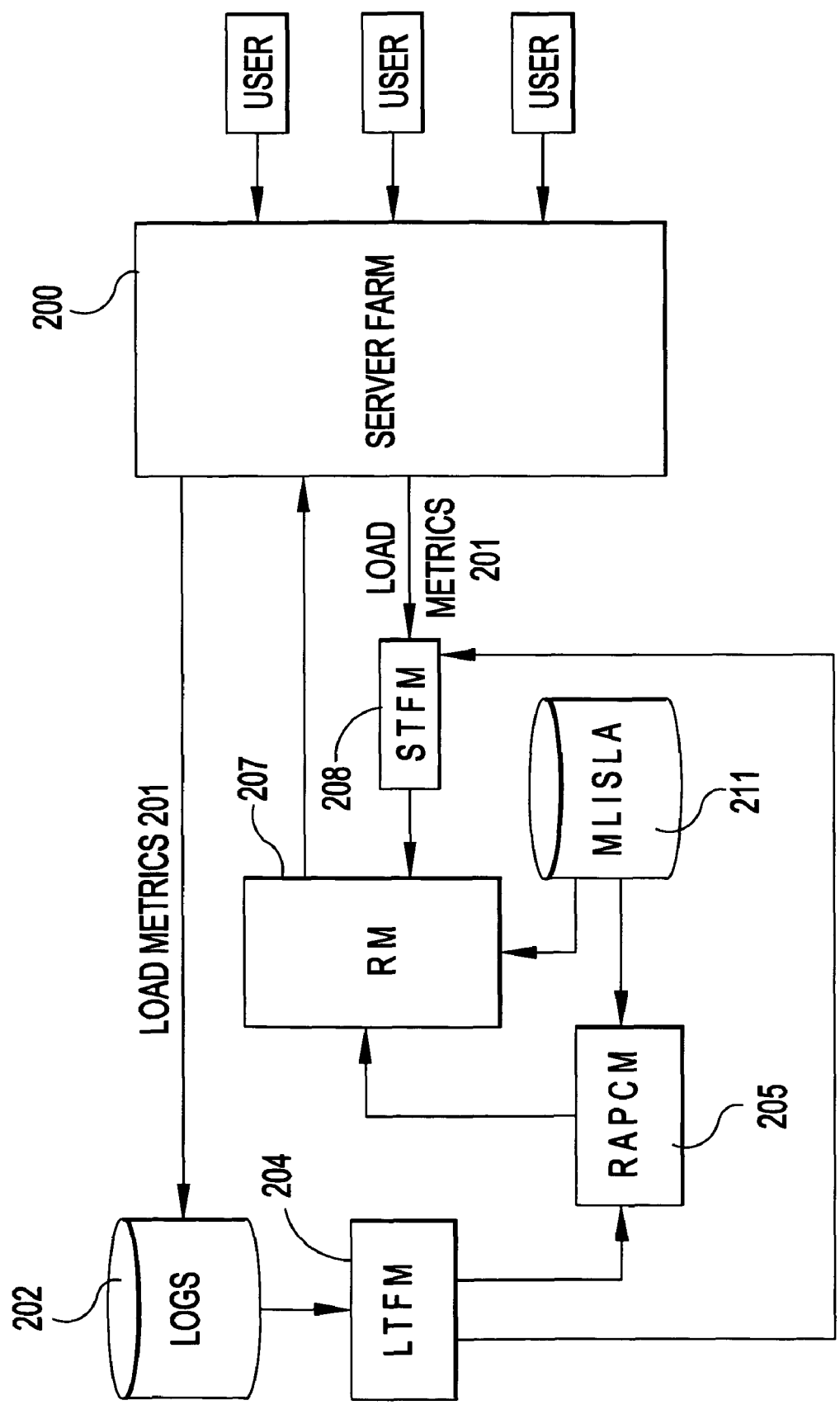
FIG. 2 illustrates a server farm system in accordance with the present invention.

FIG. 2 illustrates the DRPSF system of the present invention. Complex contract structures are supported and forecasting methods and optimization algorithms are used to allocate resources according to the current and expected load such that the revenue of the farm 200 is maximized. As shown in FIG. 2, for every customer i, the following parameters are continuously monitored, as shown at 201, and logged at 202 (associated with time stamps): load metric M(i), number of servers N(i), arrival rate and distribution of requests R(i). Once every 24 hours, the log files 202 are used by the traffic analyzer component of the LTFM 204 to generate a forecast, termed Long-Term Forecast (LTF), for the next 24 hours. This idea is based on the observation that there are seasonal patterns in the Internet traffic, so that, for every customer, similar shapes of traffic can be expected to repeat every day (possibly distinguishing between weekdays and weekends, or different days of the week, etc.). The Long Term Forecasts (LTFs) for every customer are given as input to the Resource Allocation Plan Constructor Module (RAPCM) 205 where they are consolidated with the set of MLISLAs, one for every customer, from storage 211 to produce a Resource Allocation Plan (RAP) that will maximize the revenue of the farm based on the forecasts. The structure of the RAP is a table that specifies the number of resources to be allocated to every customer in every time slot. During the next day, the RAP is used by the Resource Manager (RM) 207 as a recommendation for the allocation of resources which recommendation can be altered based on monitored metrics. The monitored metrics 201 are analyzed by the Short-Term Forecasting Module (STFM) 208 to refine the LTF for the next 10 to 20 minutes (for example) according to the past and current monitored metrics 201. The STFM generates alerts if the short-term forecast (STF) is significantly different from the LTF. The RM employs a Resource Control Algorithm (RCA) to make allocation decisions in real time according to the RAP and the alerts of the STFM, taking into account also the MLISLAs, 211. Specifically, the RCA changes the allocation of resources periodically (every time slot) to conform to the RAP. However, the STFM alerts trigger adjustments to the RAP-based allocation. The RCA is simple and fast (suitable for usage in real time). While the LTF is shown as provided to the STFM for analysis/comparison, clearly the RM could perform the analysis as an alternative. The functionality of each module as well as the algorithms and techniques that can be used to achieve the required functionality will be further detailed below. It should be understood that, although each module is shown as an independent component in FIG. 2, modules can be combined (e.g., as separate subroutines for a processing entity) provided that the functionality remains.

At the Long Term Forecasting Module (LTFM), the state of the server farm is continuously monitored and such information as the arrival rate of user requests (possibly even distinguishing between arrival rates for different types of requests), the number of servers used, and other load metrics are recorded (associated with time stamps) in log files. The LTFM uses the load metrics to construct a forecast for the next long term forecast period (e.g., the next 24 hours or a few days in advance) based on the time series created from these log files. In the preferred embodiment, the LTFs are weighted sums of a set of predetermined basis functions (e.g., sinusoids, wavelets) with time-varying weights (coefficients) modeled and predicted as nonstationary stochastic processes (e.g., vector autoregressive processes) with time-varying parameters. Adaptive filtering algorithms, such as recursive least squares, are employed to estimate and track the model parameters. Confidence intervals of the LTFs are constructed via a statistical analysis of the variability of the weights and of the modeling errors (i.e., the residuals not accounted for by the basis functions). More specifically, with the basis functions denoted by $B1(t), \ldots, Bm(t)$ for some integer m and the predicted weights (e.g., for the next 24 hours), by $W1, \ldots, Wm$, the LTF for the next 24 hours can be expressed as $$LTF(t) = W1*B1(t) + \ldots + Wm*Bm(t),$$

where t is the time index. Furthermore, with $[V(i,j)]$ denoting the estimated prediction error covariance matrix of the weights and $V(t)$ denoting the estimated variance of the modeling errors, the predicted probability distribution of the load at time t is of the form $$LFT(t) + Z*SQRT\{V(1,1)*B1(t)^2 + \ldots + V(1,m)*B1(t)\\ *Bm(t) + \ldots + V(m,m)*Bm(t)^2 + V(t)\},$$

where Z represents a zero-mean unit-variance random variable (e.g., standard Gaussian). This long-term prediction of the load distribution can be used to construct confidence intervals as well as to determine the probability distribution for the number of servers required in the Resource Allocation Plan Construction Module (RAPCM).

As described above, the MLISLAs include a mapping function MAP that maps a given load Mt to a range of servers (MIN(Mt), MAX(Mt)). Any server below (or equal to) MIN (Mt) is considered a required server and any server below (or equal to) MAX(Mt) is referred to as needed for the customer. If a server is required but not allocated, a penalty can be paid, depending upon the corresponding GUARANTEE. The customer pays a pre-specified rate, the REVENUE component in the MLISLAs, for every needed server available during a time slot. The following notations are also used: REVENUE[j] is the amount charged for the jth server if needed for a particular customer (for one time-slot); PENALTY[j] is the penalty if a server j is required but is not allocated; and GUARANTEE[j] is the guarantee level associated with the jth server, namely it is GUARANTEEi, for the unique i such that j belongs to the ith layer (MINSi≦j≦MAXSi). It should be clear, therefore, how to construct these functions for every customer i, given the corresponding MLISLAi.

The Resource Allocation Plan Constructor Module (RAPCM) operates once every 24 hours to generate a base-allocation plan (the RAP) for the next day by consolidating the long-term forecasts (LTFs) produced by the LTFM with the MLISLAs for every customer. A high-level description of the RAP construction algorithm is shown below and the process flow is detailed with reference to FIG. 3.

RAP Construction Algorithm

Input:
  $FORECAST_i$ for every customer i
  $MLISLA_i$ for every customer i

Output:
  A RAP—a table that describes a resource allocation plan. $RAP_{i,t}$ is the number of servers to be allocated to customer i at time slot t.

1. For every time slot t:
2. For every customer i:
   Construct from $MLISLA_i$ and $FORECAST_{i,t}$ an expected revenue function $ERF_{i,t}$.
3. Use the set $ERF_{i,t}$ (for every customer i) to calculate $RAP_{i,t}$—the number of servers to allocate to a customer i at time slot t (row t in the RAP table).

Figure 3:
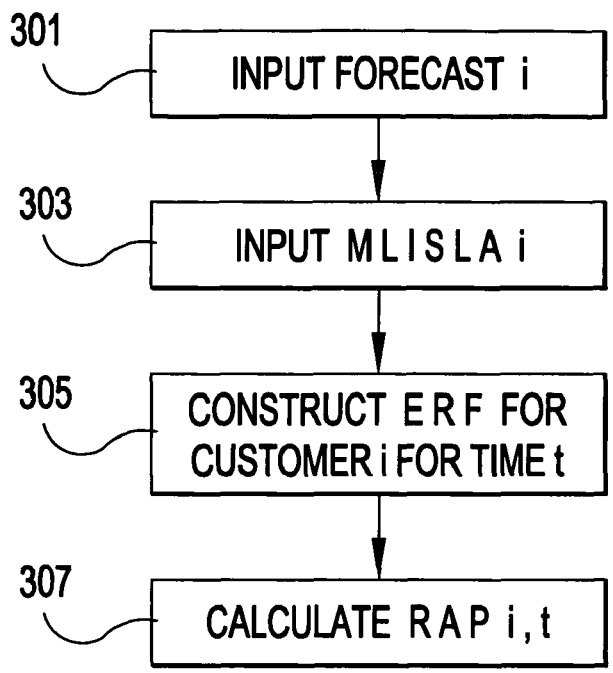
FIG. 3 provides a process flow for constructing the Resource Allocation Plan (RAP)

The process flow of FIG. 3 operates in iterations whereby the 24-hour time frame is divided into consecutive time slots. The length of the time slot is a parameter which is determined based depends on how frequently it will be worthwhile to adjust the allocation. For simplicity, it will be assumed that a time slot is one hour. In every iteration, the best allocation is determined for the next time slot by executing the following steps. First, $FORECAST_i$ for customer i and $MLISLA_i$ for customer i, are input at 301 and 303. Next, at 305, an expected revenue function ($ERF_{i,t}$) is constructed for every customer i. Next, the set $ERF_{i,t}$, for every customer i, is used in order to find the optimal allocation for time slot t at step 307. The $RAP_{i,t}$ is the content of one row, row t, in the RAP table.

The ERF Construction Algorithm is shown below and discussed in detail with reference to the process flow depicted in FIG. 4.
  Input:
  $MLISLA_1$—The contract of customer i.
  $FORECAST_{i,t}$—Forecasted probability distribution of the load $Mt_i$ for customer i at time slot t. Namely $FORECAST_{i,t}(x)$ is the probability that the load Mt will be at least x.

Output:

An expected revenue function $ERF_{i,t}$, where $ERF_{i,t}[j]$ is a weight that corresponds to the expected revenue from allocating a jth server to customer i at time slot t.

Notation:

REVENUE[j]—The charge or rate for a jth server if needed.

PENALTY[J]—The penalty for a jth server if required and not allocated.

Pr[j needed]—The probability that a jth server is needed for the customer at time t.

Pr[j required]—The probability that a jth server is required for the customer at time slot t.

For j=1, . . . ,n:
  a. Let $M_{min}^{needed}$ be the minimum load Mt s.t. MAP(Mt)= (x,y) and y≧j
  b. Pr[j needed]=Pr[Mt≧$M_{min}^{needed}$]=$FORECAST_{i,t}$ ($M_{min}^{needed}$)
  c. Let $M_{min}^{required}$ be the minimum load Mt s.t. MAP(Mt)= (x,y) and x≧j
  d. Pr[j required]=Pr [Mt≧$M_{min}^{required}$]=$FORECAST_{i,t}$ ($M_{min}^{required}$)
  e. $ERF_{i,t}[j]$=Pr[j needed] * REVENUE[j]+Pr[j required]* GUARANTEE[j]*PENALTY[j]

Figure 4:
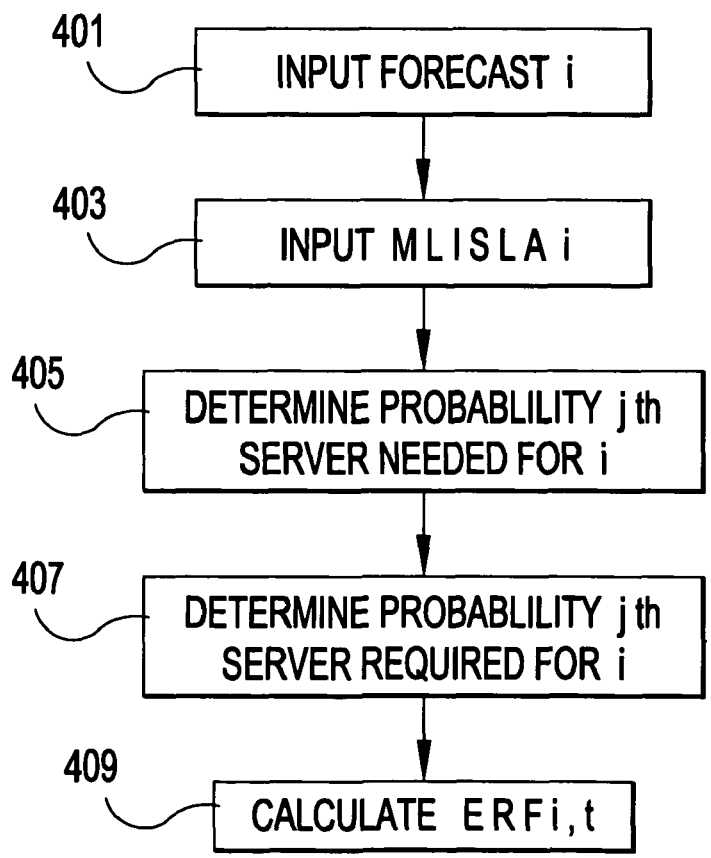
FIG. 4 provides a process flow for constructing an Expected Revenue Function (ERF) for a customer during a time slot.

FIG. 4 provides the process flow for implementing the above algorithm to construct an expected revenue function $ERF_{i,t}$ (customer i, time slot t), where $ERF_{i,t}[j]$ is a weight that corresponds to a revenue gain that can be achieved by allocating a jth server to customer i at time slot t. First, $FORECAST_{i,t}$ is input at 401 along with customer i's MLISLA at 403. $FORECAST_{i,t}$ is used to extract at 405 the probability Pr[j needed] that a jth server is needed for i. Note that the probability that a jth server is needed is the complement of the probability that MAX(Mt)<j which is given by the LTF. Next, the probability Pr[j required] that a server j is required (namely, j≦MIN(Mt)) is calculated at 407. Recall that if j is required but not allocated in more than GUARANTEE[j] percent of the time then a penalty PENALTY[j] must be paid. Finally, a weight for the expectation of the revenue gain for allocating the jth server $ERF_{i,t}[j]$ is calculated at 409. Calculating the revenue effects also takes into account the probability that a penalty must be paid if the server is not allocated. The process flow in FIG. 4 is an example of expressions that can be used to assign a weight that corresponds to an expected revenue gain for an assignment of a server to a customer. However, the actual expressions that are used in the system can be different in accordance with the exact format of the LTF and the MLISLAs definitions. Depending on the definition of GUARANTEE in the MLISLA, well-known Markov Decision Processes techniques can be used to take into account the history of violations and penalties per customer.

Figure 5:
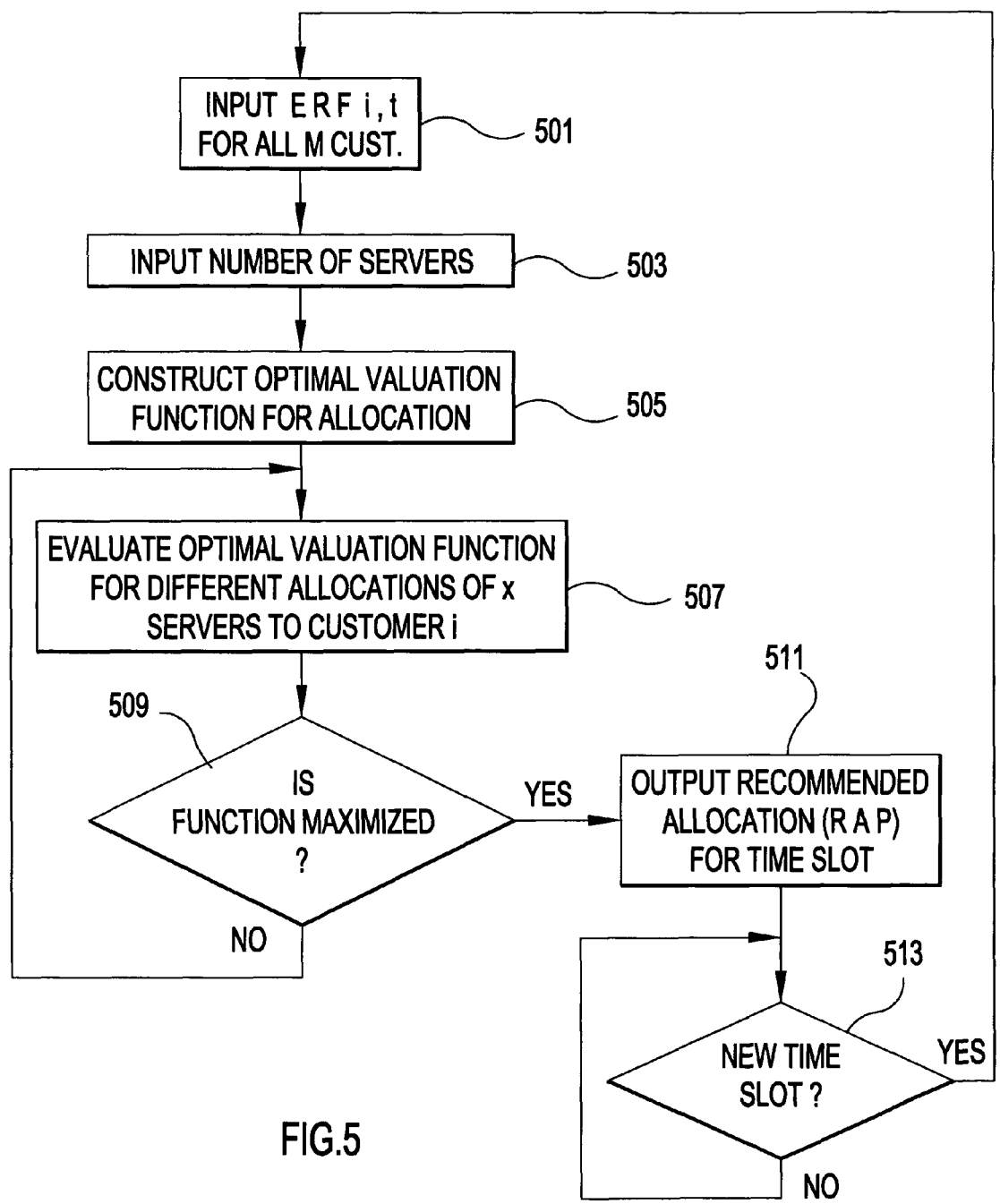
FIG. 5 provides a process flow for arriving at a resource allocation for all servers during a single time slot based on the ERFs for each customer.

FIG. 5 provides the process flow for implementing an algorithm for constructing, from a set $ERF_{i,t}$ values output from the process flow shown in FIG. 4 for all customers i, an allocation of the servers to the customers at time slot t. A formal description of the algorithm for all server allocations for all customers during time slot t is shown below. While a dynamic programming approach is shown, other methods such as stochastic linear programming can also be used for the same purpose. The goal of dynamic programming is to perform exhaustive search over all possible solutions, keeping and using temporary results to avoid repetitions. In the illustrated example, an N×M table U, where N is the number of servers and M the number of customers, is filled in. U[i,j] is the allocation that gives optimal revenue for allocating i servers to customers 1, . . . , j. The table U is filled in row by row using previous values that are kept in the table in order to calculate new values. The value of a solution to the problem is of course U[N,M].

Using the input, at 501, of the $ERF_{i,t}$ for every customer and assuming i number of servers, input at 503, a new value U[i,j] is calculated. If there are i servers to be allocated to j customers, the number of servers allocated to customer j can be anything between 0 and i. Assuming that x is the number of servers allocated to customer j. Then i-x servers are allocated to customers 1, . . . , j-1. The optimal value for such an allocation is given by $$U[i-x, j-1] + \sum_{y=1}^{x} ERFi, t[y]$$

as determined at step 505. The table having been filled row by row and the function $ERF_{i,t}[y]$ being available, all of the values that are necessary in order to evaluate this expression for any x=0, . . . , i are available. The new value U[i,j] is the value of x which maximizes the above expression, as evaluated in step 507. If the function has been maximized, as determined at 509, the recommended allocation for the time slot is output at 511 and the process is repeated will be commencement of the next time slot, as determined in step 513. In order to improve the time complexity, a bound or preset limit may be imposed on the number of servers that can be allocated to a single customer (e.g., usually less than the total number of servers N in the farm). Also, known techniques can be used to reduce the space that the algorithm consumes (e.g., one can avoid keeping an allocation vector for every entry in U by using pointers and can keep the temporary summation results of $ERF_{i,t}[y]$, thus avoiding repeating calculations). Representative psuedo-code for the single time-slot allocation construction algorithm is shown below.

Input:
  For every customer i, $ERF_{i,t}$
Output:
  For all customers i, $RAP_{i,t}$
Notation:
N—The number of servers.
M—The number of customers.
U—An auxiliary table. The entry U[i,j] is a vector describing the optimal allocation of i servers to the first j customers. U[N,M] is then the optimal allocation of the servers to the set of all customers.

1. Define U[0,*]=U[*,0]=0
2. For i=1, . . . , N
  For j=1, . . . ,M
  U[i,j]=allocation corresponding to $max_{x=0}^{i}(U[i-x,j-1]+\Sigma_{y=1}^{x}ERFj,t[y])$ 3. Output: U[N,M]

Figure 6:
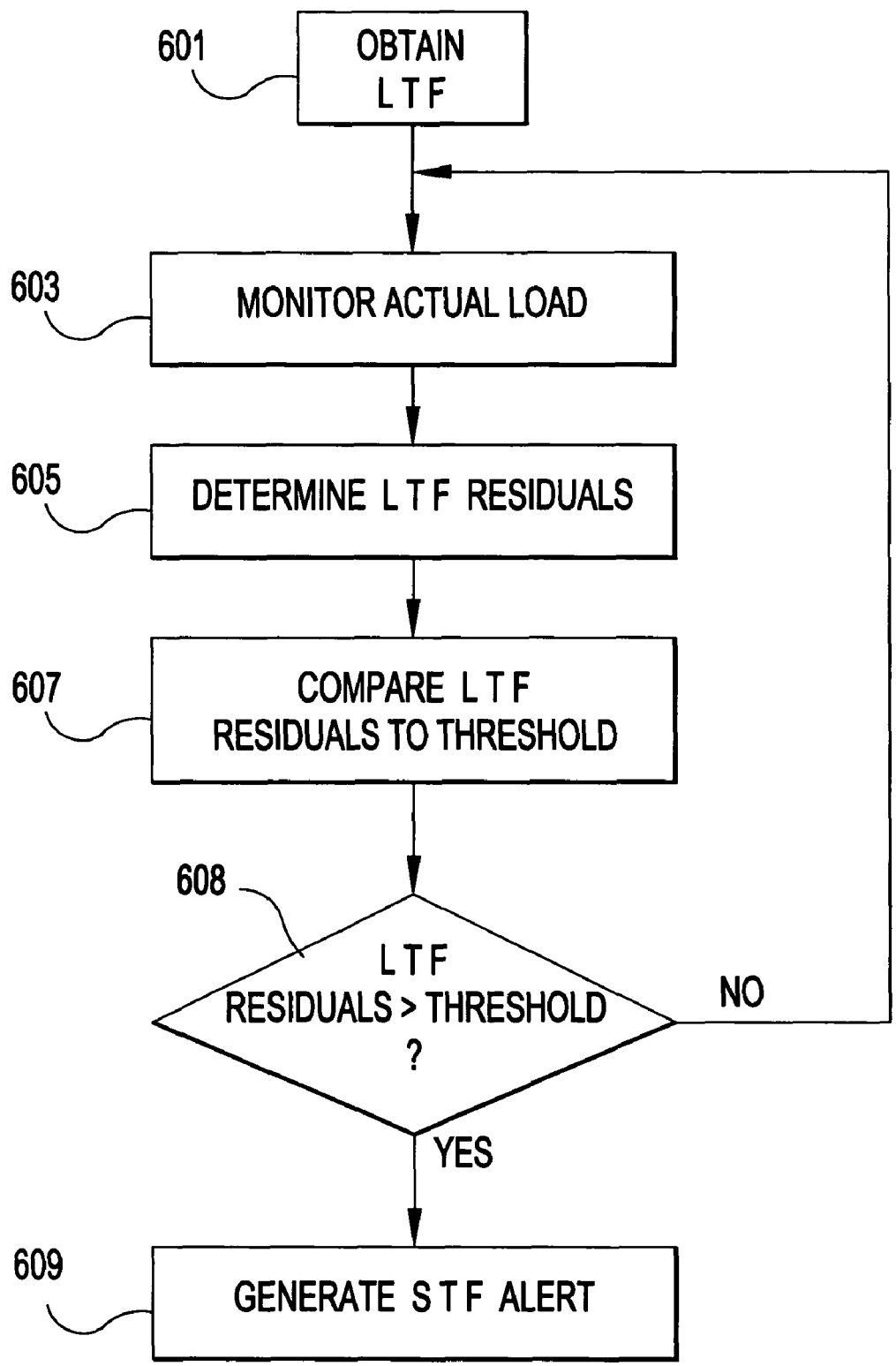
FIG. 6 illustrates a process flow for the Short Term Forecasting Module (STFM)

The short-term forecasting module (STFM) improves the long-term forecasts by offering more accurate forecasts with shorter forecasting horizons (e.g., 10-20 minutes). Based on the short-term forecast (STF), an alert is generated if the STF is significantly different from the LTF. FIG. 6 provides a representative process flow utilized by the STFM. The inputs to the STFM are the LTF, at 601, and the load metrics, at 603. From the load metrics, the actual LTF residuals (the difference between the LTF and the observed load) are determined at step 605. These residuals are modeled and predicted as a nonstationary stochastic process (e.g., autoregressive process) with time-varying parameters that are estimated and tracked by adaptive filtering algorithms (e.g., recursive least squares). In one preferred embodiment, the h-step-ahead STF at time t takes the form of STF(t+h)=LTF(t+h)+A0*X(t)+ A1*X(t−1)+ . . . +Ap*X(t−p), where X(t), X(t−1), . . . , X(t−p) are the actual current and past LTF residuals and A0, A1, . . . , Ap are adaptively estimated coefficients. With VSTF(t+h) denoting the estimated prediction error variance for the LTF residuals (obtained, for example, from recursive least squares), the short-term prediction of the probability distribution of the load can be expressed as STF(t+h)+ Y*SQRT{VSTF(t+h)}, where Y is a zero-mean and unit-variance random variable (e.g., standard Gaussian, standard Student-T, etc.). Additional parameters, if any, in the distribution of Y (e.g., the degree of freedom of a Student-T distribution) are estimated from the historical LTF residuals. Based on a comparison between the LTF residuals and a threshold at 607 and 608, an alarm will be generated at 609 if the "location" of the STF distribution is significantly different from the "location" of the LTF distribution (e.g., if the lower quartile of the STF is greater than the upper quartile of the LTF, indicating a significant upward revision of the LTF by the STF). The STFM load forecast, Mt, as input to the RCA, can be the mean or any percentile of the STF distribution.

Figure 7:
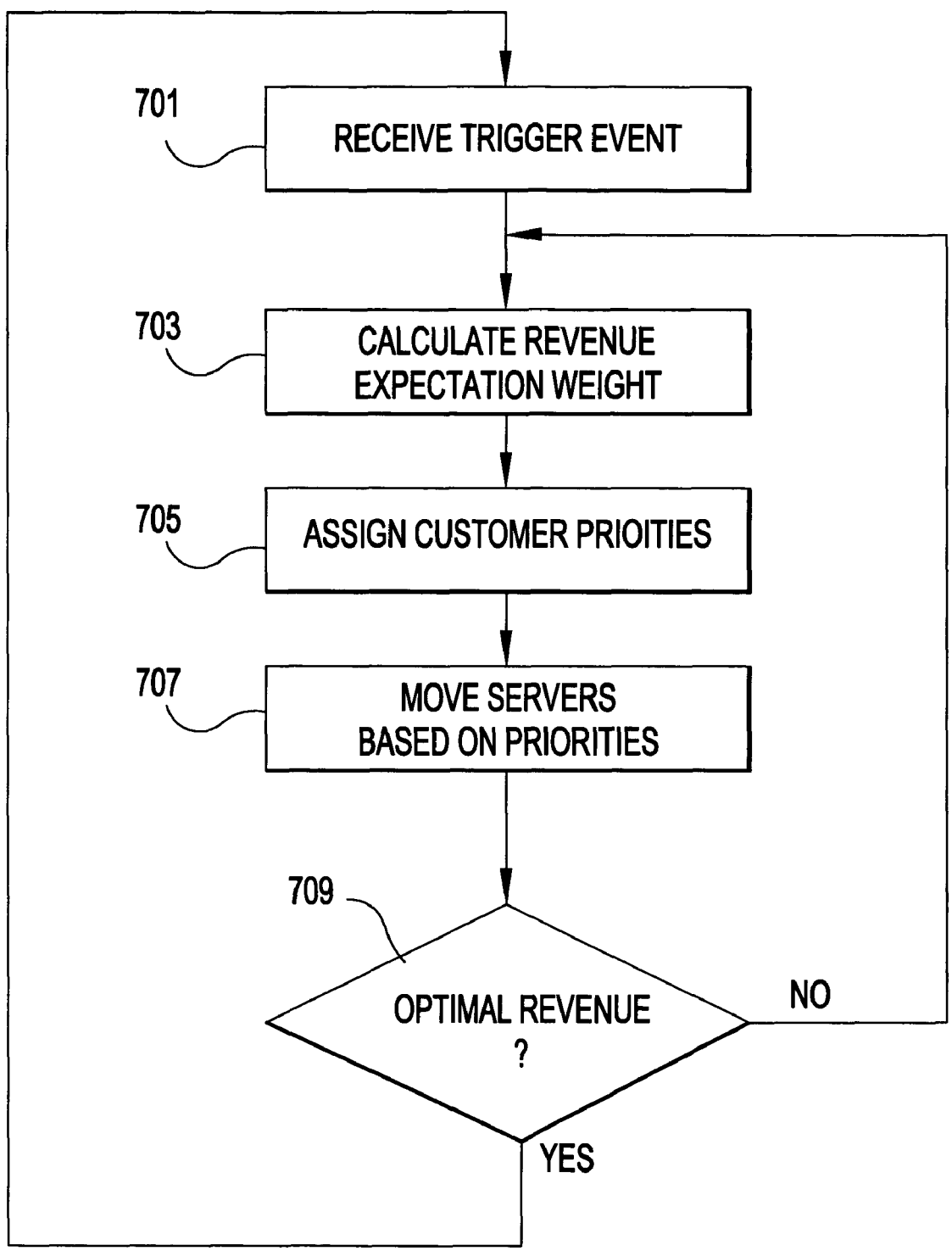
FIG. 7 provides a process flow for the Resource Manager (RM) to implement the Resource Control Algorithm (RCA).

The Resource Manager (RM) utilizes the RAP and the STFM outputs to make actual allocation decisions in real time using the Resource Control Algorithm (RCA). While in the RAPCM complex and time-consuming algorithms (e.g., dynamic programming techniques) can be used, since they are executed only once a day, in RM it is preferable to employ simple greedy algorithms, which are suitable for real-time usage, to change the RAP recommendations according to the STFM alerts and the MLISLAs. Allocation changes are triggered in two cases: periodically (every time slot) to conform to the RAP; or, in response to STFM alerts. In the case of receipt of a trigger event (i.e., expiration of a time period or receipt of an STFM alert), as detailed with reference to FIG. 7, the RAP based allocation is adjusted as follows. Upon receipt of an STFM alert at 701, a revenue expectation weight is calculated at 703 in a very similar manner to the calculation of the ERFs in RPCM (based on the STF). The revenue expectation weights are used to assign priorities to customers at 705. A server is then moved from a customer with minimum give-priority to a customer with maximum take-priority at 707. The same procedure is repeated iteratively until no further improvement in the total revenue can be achieved. Note that the number of iterations is equal to the number of servers that are re-allocated. Thus, the time-overhead is minimal (in comparison with the more sophisticated off-line algorithm in the RAPCM). Representative pseudo-code for the resource control algorithm to adjust a RAP-based allocation in response to a trigger event is detailed below.

Notation:

$ALLOC_i$—The number of servers allocated to customer i.

Mt[i]—The load forecasted by the STFM for customer i.

$REVENUE_i$—The revenue function for customer i. ($REVENUE_i[j]$ is the charge for the jth server if needed.

$PENALTY_i$—The penalty function for customer i. ($PENALTY_i[j]$ is the penalty for the jth server if required and not allocated.

(The free pool is modeled as a customer with index 0, where $REVENUE_0=PENALTY_0=0$.)

Let $MAP_i(Mt[i])=(MinS_i, MaxS_i)$ for all i>0 (for i=0, $MinS_0=MaxS_0=0$)

Define the following functions (for a customer i):

$$NEEDED_i[j] = \begin{cases} 1 & \text{if } j < \text{Max}S_i(j \text{ is needed}) \\ 0 & \text{otherwise} \end{cases}$$

$$REQUIRED_i[j] = \begin{cases} 1 & \text{if } j < \text{Min}S_i(j \text{ is required}) \\ 0 & \text{otherwise} \end{cases}$$

$GAIN_i[j]=REVENUE_i[j] \cdot NEEDED_i[j]+PENALTY_i[j] \cdot REQUIRED_i[j]$

1. For every customer i:

PRIORITY − TAKE[i] = $GAIN_i[ALLOC_i]$

PRIORITY − GIVE[i] = $GAIN_i[ALLOC_i]$

2. While (customers exist x, y s. t. PRIORITY − TAKE[x] <

PRIORITY − GIVE[y]

Move one server from x to y

ALLOCx = ALLOCx − 1

ALLOCy = ALLOCy + 1

Update

PRIORITY − TAKE[x], PRIORITY − GIVE[x],

PRIORITY − TAKE[y], PRIORITY − GIVE[y].

The invention has been described with reference to several specific embodiments. One having skill in the relevant art will recognize that modifications may be made without departing from the spirit and scope of the invention as set forth in the appended claims.

The invention claimed is:

1. A method for optimizing server farm resource usage among a plurality of contract customers comprising steps performed by a processor of:

providing a long term forecast of server resource workload for each contract customer having a contract for ongoing usage of server resources at a server farm based on previously monitored workload conditions;

building a resource allocation plan for allocation of server resources to customers for a plurality of time slots based on the long term forecast and customer contract information;

controlling the allocation of server resources in accordance with the resource allocation plan;

monitoring the current workload conditions of server resources during operation of the server farm;

providing a short term forecast based on currently monitored workload conditions at said server resources;

evaluating refinement of the resource allocation plan should said short term forecast differ from said long term forecast;

refining the resource allocation plan to generate a current resource allocation plan when the short term forecast differs from said long term forecast by more than a predetermined threshold; and adjusting the allocation of server resources in accordance with the current resource allocation plan, wherein said providing a long term forecast comprises the steps of:

constructing an expected revenue function (ERF) for every customer; and constructing a time slot allocation of resources for each of a plurality of time slots using the ERF for every customer and wherein said constructing an ERF, whereby $ERF_{i,t}[j]$ is a weight that corresponds to an expected revenue from allocating a jth server to customer i at time slot t, comprises the steps of:

providing input of $MLISLA_i$ comprising the contract of customer i, a $FORECAST_{i,t}$ comprising a forecasted probability distribution of load $Mt_i$ for customer i at time slot t whereby $FORECAST_{i,t}(x)$ is a probability that a load Mt will be at least x, REVENUE[j] comprises a charge or rate for a jth server if needed, PENALTY[j] comprises a penalty for a jth server if required and not allocated, Pr[j needed] is a probability that a jth server is needed for the customer at time t, and Pr[j required] comprises a probability that a jth server is required for the customer at time slot t; and determining the following:

for j =1, ..., n:

Let $M^{needed}_{min}$ be the minimum load Mt s.t. MAP(Mt)=(x,y) and y≧j $Pr[j\ needed]=Pr[M≧M^{needed}_{min}]=FORECAST_{i,t}(M^{needed}_{min})$ Let be the minimum load Mt s.t. MAP(Mt)=(x,y) and xj $Pr[j\ required]=Pr[Mt≧M^{needed}_{min}]=FORECAST_{i,t}(M^{needed}_{min})$ $ERF_{i,t[j]}=Pr[j\ needed]*REVENUE[j]+Pr[j\ required]*GUARANTEE[j]*PENALTY[j]$.

2. A method for optimizing server farm resource usage among a plurality of contract customers comprising steps performed by a processor of:

providing a long term forecast of server resource workload for each contract customer having a contract for on-going usage of server resources at a server farm based on previously monitored workload conditions;

building a resource allocation plan for allocation of server resources to customers for a plurality of time slots based on the long term forecast and customer contract information;

controlling the allocation of server resources in accordance with the resource allocation plan;

monitoring the current workload conditions of server resources during operation of the server farm;

providing a short term forecast based on currently monitored workload conditions at said server resources;

evaluating refinement of the resource allocation plan should said short term forecast differ from said long term forecast;

refining the resource allocation plan to generate a current resource allocation plan when the short term forecast differs from said long term forecast by more than a predetermined threshold; and adjusting the allocation of server resources in accordance with the current resource allocation plan, wherein said providing a long term forecast comprises the steps of:

constructing an expected revenue function (ERF) for every customer; and constructing a time slot allocation of resources for each of a plurality of time slots using the ERF for every customer and wherein said constructing a time slot allocation of resources for each of a plurality of time slots comprises the steps for each time slot of:

inputting $ERF_{i,t}$ for every customer i, N comprising the number of servers, M comprising a set of all customers, U comprising an auxiliary table wherein an entry U[i,j] is a vector describing the optimal allocation of i servers to the first j customers and U[N,M] is the optimal allocation of servers to the set of all customers;

determining the $RAP_{i,t}$ for all customers by the steps of:

defining U[0,*]=U[*,0]=0 for i=1, ..., N and j=1, ..., M such that U[i,j]=allocation corresponding to $\max^i_{x=0}(U[i-x,j-1]+\Sigma^x_{y=1}ERFj,t[y])$; and outputting U[N,M].

3. A system for optimizing server farm resource usage among a plurality of contract customers comprising:

a processing device for executing components;

a long term forecasting component for generating a long term forecast of server resource workload for each contract customer having a contract for on-going usage of server resources at a server farm based on previously monitored workload conditions;

a resource allocation planning component for constructing a resource allocation plan for allocation of server resources to customers for a plurality of time slots based on the long term forecast and customer contract information;

a short term forecasting component for obtaining current workload conditions of server resources during operation of the server farm and for generating a short term forecast of server resource workload based on currently monitored workload conditions; and a resource manager for controlling the allocation of server resources in accordance with the resource allocation plan, for evaluating refinement of said resource allocation plan when the short term forecast differs from the long term forecast evaluating refinement of the resource allocation plan should said short term forecast differ from said long term, for refining the resource allocation plan to generate a current resource allocation plan when the short term forecast differs from said long term forecast by more than a predetermined threshold and for adjusting the allocation of server resources in accordance with the current resource allocation plan wherein said long term forecast component comprises:

an expected revenue function (ERF) component for determining an ERF for every customer; and a time slot allocation component for determining an allocation of resources for each of a plurality of time slots using the ERF for every customer and wherein said ERF component construct an ERF, whereby $ERF_{i,t}[j]$ is a weight that corresponds to an expected revenue from allocating a jth server to customer i at time slot t, comprises the steps of:

providing input of $MLISLA_i$ comprising the contract of customer i, a $FORECAST_{i,t}$ comprising a forecasted probability distribution of load $Mt_i$ for customer i at time slot t whereby $FORECAST_{i,t}(x)$ is a probability that a load Mt will be at least x, REVENUE[j] comprises a charge or rate for a jth server if needed, PENALTY[j] comprises a penalty for a jth server if required and not allocated, Pr[j needed] is a probability that a jth server is needed for the customer at time t, and Pr[j required] comprises a probability that a jth server is required for the customer at time slot t; and determining the following:

for j=1, ..., n:

Let $M^{needed}_{min}$ be the minimum load Mt s.t. MAP(Mt)=(x,y) and y≧j $Pr[j\ needed]=Pr[M≧M^{needed}_{min}]=FORECAST_{i,t}(M^{needed}_{min})$ Let be the minimum load Mt s.t. MAP(Mt)=(x,y) and xj $Pr[j\ required]=Pr[Mt \geq M^{needed}_{min}]=FORECAST_{i,t}(M^{needed}_{min})$ $ERF_{i,t}[j]=Pr[j\ needed]*REVENUE[j]+Pr[j\ required]*GUARANTEE[j]*PENALTY[j]$.

4. A system for optimizing server farm resource usage among a plurality of contract customers comprising:
- a processing device for executing components;
- a long term forecasting component for generating a long term forecast of server resource workload for each contract customer having a contract for on-going usage of server resources at a server farm based on previously monitored workload conditions;
- a resource allocation planning component for constructing a resource allocation plan for allocation of server resources to customers for a plurality of time slots based on the long term forecast and customer contract information;
- a short term forecasting component for obtaining current workload conditions of server resources during operation of the server farm and for generating a short term forecast of server resource workload based on currently monitored workload conditions; and
- a resource manager for controlling the allocation of server resources in accordance with the resource allocation plan, for evaluating refinement of said resource allocation plan when the short term forecast differs from the long term forecast evaluating refinement of the resource allocation plan should said short term forecast differ from said long term, for refining the resource allocation plan to generate a current resource allocation plan when the short term forecast differs from said long term forecast by more than a predetermined threshold and for adjusting the allocation of server resources in accordance with the current resource allocation plan wherein said long term forecast component comprises:
- an expected revenue function (ERF) component for determining an ERF for every customer; and
- a time slot allocation component for determining an allocation of resources for each of a plurality of time slots using the ERF for every customer and
- wherein the time slot allocation component constructs a time slot allocation of resources for each of a plurality of time slots by the steps for each time slot of:
- inputting $ERF_{i,t}$ for every customer i, N comprising the number of servers, M comprising a set of all customers, U comprising an auxiliary table wherein an entry U[i,j] is a vector describing the optimal allocation of i servers to the first j customers and U[N,M] is the optimal allocation of servers to the set of all customers;
- determining the $RAP_{i,t}$ for all customers by the steps of:
- defining $U[0,*]=U[*,0]=0$ for i=1, ..., N and j=1, ..., M such that U[i,j]=allocation corresponding to $\max^{i}_{x=0}(U[i-x,j-1]+\Sigma^{x}_{y=1}ERFj,t[y])$; and
- outputting U[N,M].

\* \* \* \* \*